United States Patent
Lee et al.

(10) Patent No.: US 9,115,434 B2
(45) Date of Patent: Aug. 25, 2015

(54) WATER SPLITTING OXYGEN EVOLVING CATALYST, METHOD OF PREPARING THE CATALYST, ELECTRODE HAVING THE CATALYST, AND WATER SPLITTING OXYGEN EVOLVING DEVICE HAVING THE ELECTRODE

(75) Inventors: Jeong-hee Lee, Seongnam-si (KR); Tae-gon Kim, Hwaseong-si (KR); Tae-hyung Kim, Seoul (KR); Seoung-jae Im, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 309 days.

(21) Appl. No.: 13/561,976

(22) Filed: Jul. 30, 2012

(65) Prior Publication Data
US 2013/0180848 A1 Jul. 18, 2013

(30) Foreign Application Priority Data
Jan. 17, 2012 (KR) .................. 10-2012-0005282

(51) Int. Cl.
*C25B 9/00* (2006.01)
*B01J 23/00* (2006.01)
(Continued)

(52) U.S. Cl.
CPC ............ *C25B 1/04* (2013.01); *C01B 13/0207* (2013.01); *C25B 1/00* (2013.01); *C25B 9/00* (2013.01); *C25B 11/0478* (2013.01); *C25D 9/08* (2013.01); *Y02E 60/366* (2013.01)

(58) Field of Classification Search
CPC .. C25B 1/04; C25B 11/0447; C25B 11/0452; C25B 11/0478; B01J 23/75; B01J 23/825; B01J 21/02; B01J 21/06; B01J 23/02; B01J 23/14; B01J 35/1004; B01J 35/1014; B01J 35/1019; B01J 35/1023; B01J 35/00–35/02; B01J 23/835
USPC ........... 204/292; 205/632; 502/260, 327, 326, 502/325, 332, 349
See application file for complete search history.

(56) References Cited

U.S. PATENT DOCUMENTS

| | | | |
|---|---|---|---|
| 6,468,499 B1 | 10/2002 | Balachandran et al. | |
| 2006/0213331 A1 | 9/2006 | Otsuka et al. | |
| 2010/0101955 A1 | 4/2010 | Nocera et al. | |
| 2013/0037417 A1* | 2/2013 | Jia et al. ................ | 205/635 |

FOREIGN PATENT DOCUMENTS

| | | | | |
|---|---|---|---|---|
| EP | 1262224 A1 * | 12/2002 | ................ | 502/100 |
| JP | 11322301 A | 11/1999 | | |
| KR | 1020090091503 A | 8/2009 | | |

OTHER PUBLICATIONS

Cao et al. (Journal of Physical Chemistry B, 2006, 110, 15858-15863).*

(Continued)

*Primary Examiner* — Luan Van
*Assistant Examiner* — Alexander W Keeling
(74) *Attorney, Agent, or Firm* — Cantor Colburn LLP (57) ABSTRACT

A water splitting oxygen evolving catalyst including: a metal oxide particle including a metal oxide represented by Formula 1:

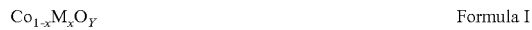

$$Co_{1-x}M_xO_Y \qquad \text{Formula I}$$

wherein M is at least one selected from Al, In, Ga, Si, and Sn, x and y respectively satisfy the inequalities $0 \leq x < 0.5$ and $1 < y < 2$, and the metal oxide particle is in the form of a flake.

16 Claims, 8 Drawing Sheets

(51) Int. Cl.
*B01J 23/56* (2006.01)
*B01J 21/00* (2006.01)
*B01J 23/40* (2006.01)
*B01J 23/42* (2006.01)
*C25B 1/00* (2006.01)
*C25B 1/04* (2006.01)
*C25B 11/04* (2006.01)
*C01B 13/02* (2006.01)
*C25D 9/08* (2006.01)

(56) References Cited

OTHER PUBLICATIONS

Yin, Q. et al.; A Fast Soluble Carbon-Free Molecular Water Oxidation Catalyst Based on Abundant Metals, Science vol. 328, 342 (2010).

Kanan, M.W. et al; In situ formation of an oxygen-evolving catalyst in neutral water containing phosphate and co2+, Science vol. 321, 1072 (2008).

* cited by examiner

FIG. 3A
<TOP VIEW>

FIG. 3B
<TOP VIEW(ENLARGED)>

FIG. 3C
<CROSS-SECTIONAL VIEW>

FIG. 4A

<TOP VIEW>

FIG. 4B

<TOP VIEW(ENLARGED)>

FIG. 4C

<CROSS-SECTIONAL VIEW>

WATER SPLITTING OXYGEN EVOLVING CATALYST, METHOD OF PREPARING THE CATALYST, ELECTRODE HAVING THE CATALYST, AND WATER SPLITTING OXYGEN EVOLVING DEVICE HAVING THE ELECTRODE

This application claims priority to and the benefit of Korean Patent Application No. 10-2012-0005282, filed on Jan. 17, 2012, and all the benefits accruing therefrom under 35 U.S.C. §119, the content of which is incorporated herein in its entirety by reference.

BACKGROUND

1. Field

The present disclosure relates to a water splitting oxygen evolving catalyst, a method of preparing the catalyst, an electrode having the catalyst, and a water splitting oxygen evolving device having the electrode.

2. Description of the Related Art

Recently, hydrogen-based energy has been considered as a solution to address the exhaustion of carbon-based energy and environmental problems caused by fossil fuel emissions. Accordingly, efforts continue on methods to produce hydrogen by splitting water using the energy of the sun.

In order to split water, an improved photocatalyst, which produces electrons and holes by absorbing solar energy to make hydrogen and oxygen, would be desirable. However, since splitting water with high efficiency is difficult with only the photocatalyst, a co-catalyst (an electrocatalyst) has been proposed for hydrogen and oxygen generation. Particularly, a reaction rate of the oxygen generation reaction is slow since one oxygen atom is generated from 2 water molecules to yield 4 electrons (i.e., $2H_2O \rightarrow 4H^+ + 4e^- + O_2$). Thus, holes having an over voltage are desirable in order to increase the rate of the oxygen generation, but when the holes produced by the photocatalyst do not have enough over voltage, the oxygen generation rate may be insufficient. Therefore, the electrocatalyst is desired to improve oxygen generation.

Water splitting oxygen evolving catalysts known to date may be roughly divided into organic-based catalysts and inorganic-based catalysts. The organic-based catalysts may be decomposed by light, and thus, and thus have unsuitable stability. The inorganic-based catalysts may be subdivided into heterogeneous bulk oxide-based catalysts and homogeneous polyoxometalate-based catalysts (See, for example, Qiushi Yin et al., A Fast Soluble Carbon-Free Molecular Water Oxidation Catalyst Based on Abundant Metals, Science Vol. 328, 342 (2010)). The heterogeneous bulk oxides-based catalysts can have insufficient catalytic activity. Also, since the homogeneous polyoxometalate-based catalysts are uniformly dissolved in an electrolyte, a significant fraction of thereof is disconnected from an electrode, and thus, utility per unit weight is poor.

An oxygen-evolving electrocatalyst using cobalt (cobalt-oxide-phosphate, "CoPi") has been recently developed by a group under professor Nocera at MIT (Matthew W. Kanan and Daniel G. Nocera, In situ formation of an oxygen-evolving catalyst in neutral water containing phosphate and Co2+, Science Vol. 321, 1072 (2008)), and although it is a heterogenous catalyst, it may be coated on an electrode in the amorphous state. Thus, a large amount of cobalt ions exposed in water or other solution is obtained, and thus, the catalyst has high catalytic activity.

SUMMARY

Provided in an embodiment is a water splitting oxygen evolving catalyst including a metal oxide having a flake shape.

Provided in an embodiment is a method of preparing the water splitting oxygen evolving catalyst.

Provided in an embodiment is an electrode including the water splitting oxygen evolving catalyst.

Also provided is a water splitting oxygen evolving device.

Additional aspects will be set forth in part in the description which follows and, in part, will be apparent from the description.

Disclose is a water splitting oxygen evolving catalyst including: a metal oxide particle including a metal oxide represented by Formula 1:

$$Co_{1-x}M_xO_Y \qquad \text{Formula I}$$

wherein M is at least one selected from Al, In, Ga, Si, and Sn, x and y respectively satisfy the inequalities $0 \leq x < 0.5$ and $1 < y < 2$, and the metal oxide particle is in the form of a flake According to an aspect, a water splitting oxygen evolving catalyst including a metal oxide in a flake shape is provided.

The metal oxide may include Co.

The metal oxide may further include at least one metal selected from the group consisting of Al, In, Ga, Si, and Sn.

The metal oxide may be represented by Formula 1 below:

$$Co_{1-x}M_xO_Y \qquad \text{Formula I}$$

wherein M may be Al, In, Ga, Si, or Sn, and x and y respectively may satisfy inequalities $0 \leq x < 0.5$ and $1 < y < 2$.

The metal oxide may have an aspect ratio of about 50 to about 500.

A specific surface area of the metal oxide measured by an electrochemical method may be about 50 m$^2$/g to about 1000 m$^2$/g.

According to another aspect, an electrode including the water splitting oxygen evolving catalyst is provided.

According to another aspect, a water splitting oxygen evolving device including the electrode as a working electrode; a counter electrode; and a buffered aqueous electrolyte solution including a proton-accepting anion is provided.

The proton-accepting anions may include at least one type of ion selected from a phosphate ion, an acetate ion, a borate ion, and a fluoride ion.

A pH of the buffered aqueous electrolyte solution is about 2 to about 14.

According to another aspect, a method of preparing a water splitting oxygen evolving catalyst includes providing a metal nitrate aqueous solution; adding the metal nitrate aqueous solution to an electrochemical cell including a working electrode and a counter electrode; applying a voltage between the working electrode and the counter electrode so that the working electrode has a negative potential and a metal hydroxide is formed from the metal nitrate on the working electrode; and heat treating the metal hydroxide on the working electrode to convert the metal hydroxide to a metal oxide to prepare the water splitting oxygen evolving catalyst.

The metal nitrate aqueous solution may include Co.

The metal nitrate aqueous solution may further include at least one type of metal selected from Al, In, Ga, Si, and Sn.

The negative potential formed on the working electrode may be about −0.5 V to about −1.5 V versus Ag/AgCl, and the applying of the voltage may last for about 1 minute to about 5 minutes.

The working electrode may include a fluorinated tin oxide ("FTO"), an indium tin oxide ("ITO"), or a metal.

The reference electrode may include at least one selected from Ag/AgCl, saturated calomel electrode, Hg/HgO, and Hg/Hg$_2$SO$_4$.

The counter electrode may include at least one selected from platinum, nickel, carbon, and iron.

The heat treatment may be performed at a temperature of about 300° C. to about 450° C.

Also disclosed is a water splitting oxygen evolving catalyst effective to split water at a potential of −0.5 V to −1.5 V versus Ag/AgCl, the catalyst including: a metal oxide particle including a metal oxide represented by Formula 1:

$$Co_{1-x}M_xO_Y \quad \text{Formula I}$$

wherein M is at least one selected from Al, In, Ga, Si, and Sn, and x and y respectively satisfy the inequalities 0≤x<0.5 and 1<y<2.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a water splitting oxygen evolving catalyst, a method of preparing the catalyst, an electrode having the catalyst, and a water splitting oxygen evolving catalyst are disclosed in further detail.

The water splitting oxygen evolving catalyst according to an embodiment includes a metal oxide particle in the form of a flake. The water splitting oxygen evolving catalyst including the metal oxide particle in the form of a flake has high activity and high operational stability due to its high specific surface area. As used herein, the term "flake" refers to a shape of a 3-dimensional particle and refers to a thin particle having a high aspect ratio. Also, the term "operational stability" refers to a degree to which the water splitting oxygen evolving catalyst is not dissolved in a buffered aqueous electrolyte solution and remains attached to an electrode when used in a water splitting oxygen evolving device.

The metal oxide particle may include Co. For example, the metal oxide particle may have a $Co_3O_4$-type structure. As used herein, a term "a $Co_3O_4$-type structure" refers to (i) $Co_3O_4$ itself, (ii) a metal oxide doped with a metal other than Co on Co sites of $Co_3O_4$, or (iii) a complex metal oxide in which $Co_3O_4$ and at least one oxide of a metal other than Co (e.g., $Al_2O_3$, etc.) are simultaneously present.

The metal oxide particle may further include at least one type of metal (hereinafter, referred to as "an additional metal"), such as a metal comprising at least one metal selected from Al, In, Ga, Si, and Sn.

The additional metal has high acid resistance (or corrosion resistance). While not wanting to be bound by theory, it is understood that inclusion of the additional metal in the metal oxide provides improved acid resistance. A metal oxide formed of only $Co_3O_4$ can be substantially soluble (i.e., can dissolve in) a solution with a low pH (e.g., an acid solution). When a water splitting oxygen evolving reaction occurs ($2H_2O \rightarrow O_2 + 4H^+ + 4e^-$), the generated protons may cause the solution to become more acidic, causing dissolution of the catalyst. While not wanting to be bound by theory, it is understood that because the disclosed metal oxide has reduced solubility in acid, when a water splitting oxygen evolving reaction ($2H_2O \rightarrow O_2 + 4H^+ + 4e^-$) takes place using the water splitting oxygen evolving catalyst including the metal oxide, a solubility of the metal oxide in the buffered aqueous electrolyte solution may be improved (i.e., reduced), even if a pH of the buffered aqueous electrolyte aqueous solution (e.g., buffer 22 of FIG. 2) decreases, as may occur over time as the reaction proceeds. In other words, an amount of the metal oxide which is dissolved in the buffered aqueous electrolyte solution may be reduced even when the pH of the buffered aqueous electrolyte solution is decreased, even though the proton ($H^+$) concentration) increases as the water splitting oxygen evolving reaction takes place. Thus, the water splitting oxygen evolving catalyst may have an improved activity, in spite of being in contact with an acidic solution, such as may occur when the catalyst is used in the water splitting oxygen evolving reaction for a long time.

The metal oxide of the metal oxide particle may be represented by Formula 1 below:

$$Co_{1-x}M_xO_y,$$

Formula I wherein M is at least one selected from Al, In, Ga, Si, and Sn, and x and y satisfy $0 \leq x <$ about 0.5 and about $1 < y <$ about 2, respectively. In an embodiment, $0 \leq x < 0.5$ and $1 < y < 2$, specifically about $0.1 \leq x <$ about 0.4 and about $1.1 < y <$ about 2, more specifically about $0.2 \leq x <$ about 0.3 and about $1.2 < y <$ about 1.5.

The metal oxide particle may be in the form of a flake. The metal oxide particle may have an aspect ratio of about 50 to about 500, specifically about 60 to about 450, more specifically about 70 to about 400. If the aspect ratio of the metal oxide particle is within the range above, a number of catalytic active sites which are in contact with the electrolyte is increased, and thus catalytic activity is improved while suitable durability and electronic conductivity may also be provided. The flake may have any suitable cross-sectional shape, and may have a circular, rectilinear, or ellipsoidal cross-section. The flake may have a length of about 0.1 micrometer (μm) to about 100 μm, specifically about 1 μm to about 50 μm, more specifically about 2 μm to about 25 μm. The flake may have a width of about 0.1 μm to about 100 μm, specifically about 1 μm to about 50 μm, more specifically about 2 μm to about 25 μm. Also, the flake may have a thickness of about 0.01 μm to about 10 μm, specifically about 0.05 μm to about 5 μm, more specifically about 0.1 μm to about 2 μm.

The specific surface area of the metal oxide particle, measured by an electrochemical method, may be about 50 square meters per gram ($m^2/g$) to about 1000 $m^2/g$, specifically about 60 $m^2/g$ to about 900 $m^2/g$, more specifically about 70 $m^2/g$ to about 800 $m^2/g$. If the specific surface area of the metal oxide particle, when measured by the electrochemical method, is within the range above, the number of catalytic active sites may be increased.

Figure 1:
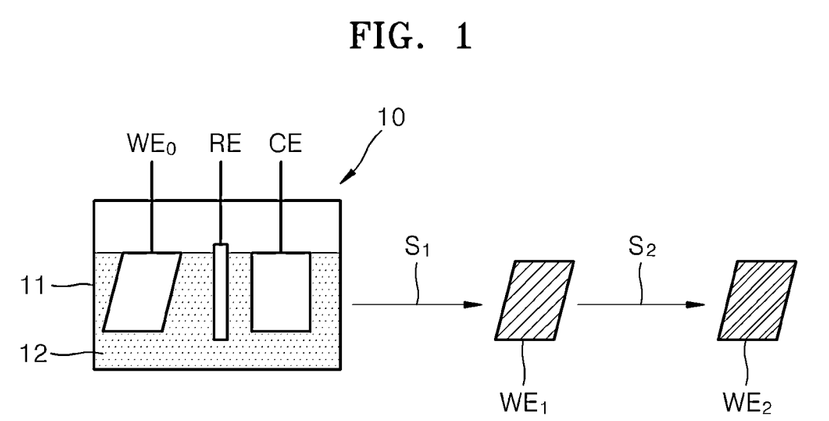
FIG. 1 is a schematic drawing of an embodiment of a method of preparing a water splitting oxygen evolving catalyst.

Next, referring to FIG. 1, a method of preparing the water splitting oxygen evolving catalyst is disclosed in further detail.

FIG. 1 is a schematic drawing of an embodiment of the method of preparing the water splitting oxygen evolving catalyst.

First, a metal nitrate aqueous solution 12 is prepared by dissolving a metal nitrate in water. The metal nitrate may include Co, and may further comprise at least one selected from Al, In, Ga, Si, and Sn. For example, only $Co(NO_3)_2$ may be used for the metal nitrate, or $CO(NO_3)_2$ may be used with at least one selected from $Al(NO_3)_3$, $In(NO_3)_3$, $Ga(NO_3)_3$, $Na_2SiO_3$, and $SnSO_4$. An embodiment wherein the metal nitrate comprises Co and Al, or Co and Si, is specifically mentioned.

Subsequently, the metal nitrate aqueous solution 12 is added to an electrochemical cell, such as a 3-electrode cell 10.

The 3-electrode cell 10 includes a container 11, and a working electrode $WE_0$, a reference electrode RE, and a counter electrode CE that are disposed in the container 11.

The working electrode $WE_o$ may include at least one selected from a fluorinated tin oxide ("FTO"), an indium tin oxide ("ITO"), a metal (e.g., stainless steel, or nickel), or carbon.

The reference electrode RE may include at least one selected from Ag/AgCl, saturated calomel electrode ("SCE"), Hg/HgO, and $Hg/Hg_2SO_4$. For example, Ag/AgCl (in 3 molar (M) NaCl) may be used for the reference electrode RE.

The counter electrode may include at least one selected from platinum, nickel, carbon, and iron. Also, the counter electrode may have any suitable form, and may be a foil, a woven material, or a non-woven material. For example, platinum gauze may be used for the counter electrode.

Next, a metal hydroxide is formed from the metal nitrate aqueous solution 12 and the formed metal hydroxide is electrochemically disposed (e.g., coated) on the working electrode $WE_o$ by applying a voltage between the working electrode $WE_o$ and the counter electrode CE such that the working electrode $WE_o$ is at a selected potential relative to the reference electrode RE to form a negative potential on the working electrode $WE_o$. As a result, a working electrode $WE_1$, coated with the metal hydroxide, is obtained. While not wanting to be bound by theory, it is understood that a mechanism of the forming of the metal hydroxide from the metal nitrate aqueous solution 12 is as follows. When a voltage is applied between the working electrode $WE_o$ and the counter electrode CE such that the working electrode is at a negative potential relative to the reference electrode RE, a cathode reduction reaction ($NO_3^- + H_2O + 2e^- \rightarrow NO_2^- + 2OH^-$) for forming a hydroxyl group ($OH^-$) occurs at the working electrode $WE_O$. Then the hydroxyl group ($OH^-$) produced by the cathode reduction reaction combines with a metal ion (e.g., $Co^{2+}$), which is included in the metal nitrate aqueous solution 12, to form a metal hydroxide (e.g., $Co(OH)_2$).

The negative potential formed on the working electrode $WE_o$ may be about −0.5 V to about −1.5 V, specifically about −0.6 V to about −1.4 V, more specifically about −0.7 V to about −1.3 V, versus Ag/AgCl, and application of the voltage may last for about 0.1 minute to about 50 minutes, specifically about 1 minute to about 5 minutes, more specifically about 2 minutes to about 4 minutes. If the negative potential and the application time of the voltage are each within the ranges above, the formation of the metal hydroxide and the coating of the produced metal hydroxide on the working electrode $WE_0$ may be effectively performed with a relatively low cost.

Hereinafter, the metal hydroxide (e.g., $Co(OH)_2$) may be converted to a metal oxide (e.g., $Co_3O_4$) by heat treating (e.g., sintering) the working electrode $WE_1$ coated with the metal hydroxide. As a result, a working electrode $WE_2$ coated with the metal oxide and having a flake shape may be obtained.

The heat treatment may be performed at a temperature of about 300° C. to about 450° C., specifically about 325° C. to about 425° C., more specifically about 350° C. to about 400° C. If the temperature of the heat treatment is within the range above, a conversion rate of the metal hydroxide to the metal oxide is suitable, and deformation of the working electrode is insubstantial or does not occur. The heat treatment may be performed in air.

A duration time of the heat treatment is not particularly limited, and may be sufficient time (e.g., about 10 minutes or more, specifically about 1 to about 100 minutes) to convert the metal hydroxide to the metal oxide having a flake shape.

According to another embodiment, an electrode including the water splitting oxygen evolving catalyst described above is provided. For example, the electrode may be an electrode including a conductive oxide such as FTO or ITO, or including a metal, such as at least one metal selected from nickel, copper, aluminum, steel, stainless steel, or silver, coated with a metal oxide having a flake shape.

According to another embodiment, a water splitting oxygen evolving device including the electrode described above is provided.

Hereinafter, referring to FIG. 2, the water splitting oxygen evolving device is described in further detail.

Figure 2:
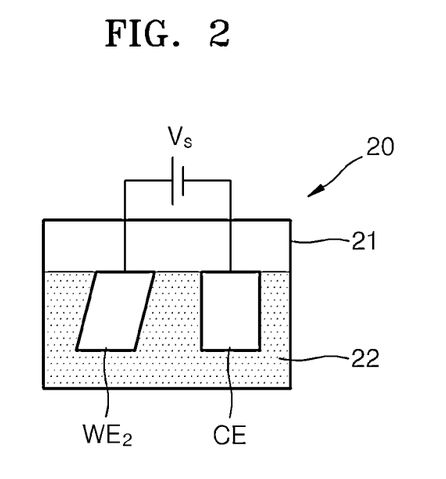
FIG. 2 is a schematic drawing illustrating an embodiment of a water splitting oxygen evolving device.

FIG. 2 is a schematic drawing illustrating a water splitting oxygen evolving device 20 according to an embodiment.

Referring to FIG. 2, the water splitting oxygen evolving device 20 includes a container 21, a buffered aqueous electrolyte solution 22 disposed in the container 21, and a working electrode $WE_2$ and a counter electrode CE that are disposed in the container 21.

The buffered aqueous electrolyte solution 22 serves as a source of water used during a water splitting oxygen evolving reaction and as an acceptor of protons produced during the water splitting oxygen evolving reaction. To serve as the acceptor of the protons, the buffered aqueous electrolyte solution 22 includes a proton-accepting anion. Thus, when the water splitting oxygen evolving reaction takes place using the water splitting oxygen evolving device 20, a reduction of the pH of the buffered aqueous electrolyte solution 22 may be reduced by the action of the buffer. Accordingly, a solubility of the metal oxide (included in the working electrode $WE_2$) in the buffered aqueous electrolyte solution may be reduced because the buffer lessens the reduction in the pH of the solution. In other words, although the amount of protons ($H^+$) increases as the water splitting oxygen evolving reaction proceeds, the proton-accepting anions accept at least a portion of the protons, and thus, the reduction in the pH of the buffered aqueous electrolyte solution 22 is reduced. Accordingly, an amount of dissolution of the metal oxide in the buffered aqueous electrolyte solution is also reduced. Therefore, the water splitting oxygen evolving device 20 may provide stable performance even for an extended period of time, such as about 1 to about 10,000 hours, specifically about 10 to about 1000 hours.

The proton-accepting anions may include at least one type of ion selected from the group consisting of a phosphate ion, an acetate ion, a borate ion, and fluoride ion.

The buffered aqueous electrolyte solution 22 may include, for example a potassium phosphate ("KPi"), such as at least one selected from $KH_2PO_4$, $K_2HPO_4$, and $K_3PO_4$.

A pH of the buffered aqueous electrolyte solution 22 may be about 2 to about 14, specifically about 2.5 to about 13.5, more specifically about 3 to about 13. In an embodiment, the pH of the buffered aqueous electrolyte solution 22 may be about 2 to about 7, specifically about 2.2 to about 6.8, more specifically about 2.4 to about 6.6. If the pH of the buffered aqueous electrolyte solution 22 is within the range above, high activity may be maintained since the catalyst is not substantially dissolved in the electrolyte.

The working electrode $WE_2$ and the counter electrode CE of the device may be as described above. Thus, a repetitive detailed description thereof is omitted here.

When a voltage Vs is applied between the working electrode $WE_2$ and the counter electrode in the water splitting oxygen evolving device 20 having the construction disclosed above, the water splitting oxygen evolving reaction described above occurs on the working electrode $WE_2$.

The disclosed embodiments will now be further described by explaining preferred embodiments. However, that disclosed may be embodied in many different forms and shall not be construed as being limited to the embodiments set forth herein.

EXAMPLES

Examples 1 through 3

Preparation of Water Splitting Oxygen Evolving Catalyst and Electrode

A metal nitrate aqueous solution was prepared by dissolving one or two types of metal nitrates in water. A type and content of the metal nitrate, the content of the water used in each of Examples, and the type of the resulting metal oxide are shown in Table 1. Next, the prepared metal nitrate aqueous solution was added to a 3-electrode cell in which a fluorine-doped tin oxide ("FTO") working electrode, a Ag/AgCl (3M NaCl) reference electrode, and a platinum gauze counter electrode were installed. Subsequently, a voltage was applied between the working electrode and the counter electrode for one minute such that the working electrode was at a negative potential of −1.0 V versus the reference electrode. As a result, a working electrode coated with a metal hydroxide was obtained. Then, the working electrode coated with the metal hydroxide was heat-treated at 300° C. for 10 minutes using a hot plate to convert the metal hydroxide to a metal oxide. As a result, a working electrode coated with the metal oxide (i.e., a water splitting oxygen evolving catalyst) is obtained. Also, the composition of each metal oxide coated on the working electrode is shown in Table 1.

TABLE 1

| | | Example 1 | Example 2 | Example 3 |
|---|---|---|---|---|
| Metal Nitrate (mol) | $Co(NO_3)_2$ | 0.015 | 0.0135 | 0.0135 |
| | $Al(NO_3)_3$ | 0 | 0.0015 | 0 |
| | $Na_2SiO_3$ | 0 | 0 | 0.0015 |
| | Water (mL) | 50 | 50 | 50 |
| | Type | Co—O | Co—Al—O | Co—Si—O |

Comparative Example 1

Preparation of Water Splitting Oxygen Evolving Catalyst and Electrode

A commercial $Co(NO_3)_2 \cdot 6H_2O$ (Samchun Chemical) was heated at a temperature of 550° C. in air for 12 hours to obtain a powder of $Co_3O_4$. Then, a $Co_3O_4$ slurry was prepared by mixing 0.15 grams (g) of the obtained powder of $Co_3O_4$ and 0.5 milliliters (mL) of diethylene glycol in a mortar. Separately, a tape was attached to a FTO substrate to mask a portion of the substrate so that only 1 cm$^2$ of a surface of the FTO substrate would be coated with the $Co_3O_4$ slurry. Next, the surface of the FTO substrate and the tape was uniformly coated with the $Co_3O_4$ slurry and dried at room temperature (e.g., 25° C.) for 10 minutes, and then the tape was removed from the FTO substrate. Lastly, a working electrode was obtained by heat treating the resulting structure at 300° C. for 10 minutes using a hot plate.

Comparative Example 2

Preparation of Water Splitting Oxygen Evolving Catalyst and Electrode

A 0.1 M KPi aqueous solution having a pH of 7 including 0.5 mM $Co(NO)_3$ (i.e., prepared by mixing $K_2HPO_4$ and $KH_2PO_4$ in an appropriate ratio to provide a solution having a total concentration of phosphate ion of 0.1 M with a pH of 7) was added to a 3-electrode cell installed with a FTO working electrode, a Ag/AgCl (3 M NaCl) reference electrode, and a platinum gauze counter electrode. Then, a voltage was applied between the working electrode and the counter electrode for 1 hour such that the working electrode was at a positive potential of +1.1 V versus the reference electrode. As a result, a working electrode coated with CoPi (cobalt phosphate) was obtained.

EVALUATION EXAMPLE

Evaluation Example 1

Analysis of SEM

Figure 3A:
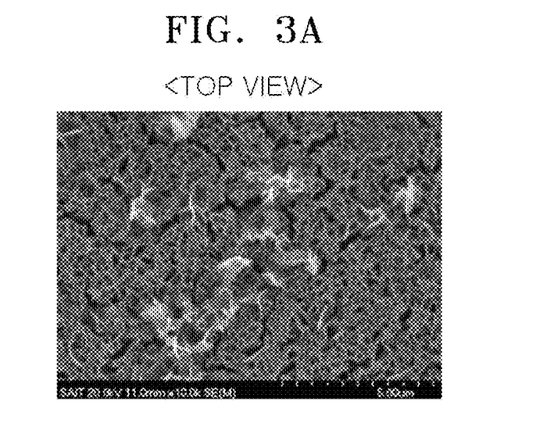
FIGS. 3A to 3C are scanning electron micrographs ("SEMs") of an electrode prepared in Example 1, showing a top view, an enlarged view of the top view, and a cross-sectional view, respectively.
Figure 3B:
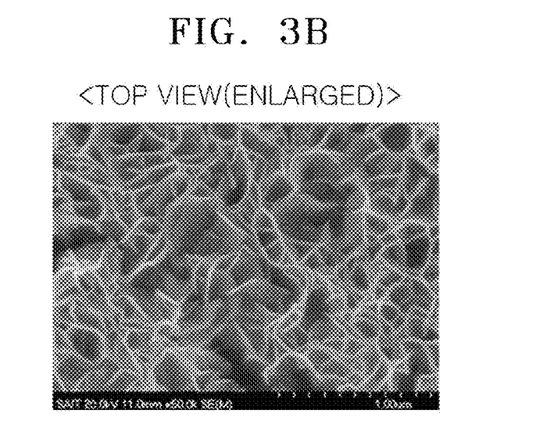
Figure 3C:
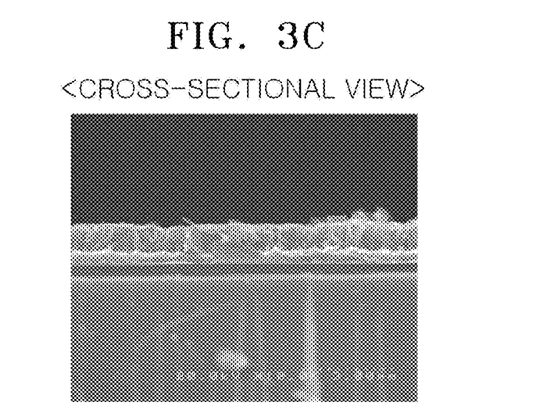
Figure 4A:
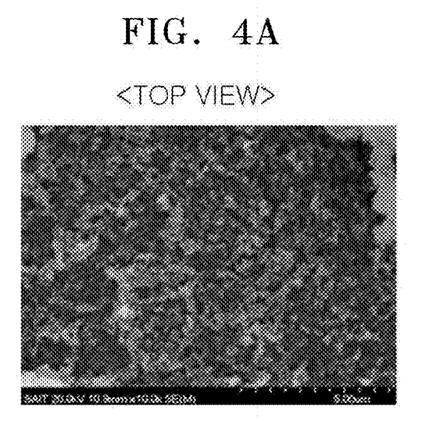
FIGS. 4A to 4C are SEMs of an electrode prepared in Comparative Example 1, showing a top view, an enlarged portion of the top view, and a cross-sectional view, respectively.
Figure 4B:
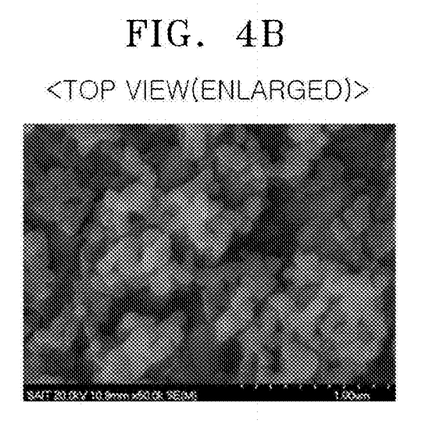
Figure 4C:
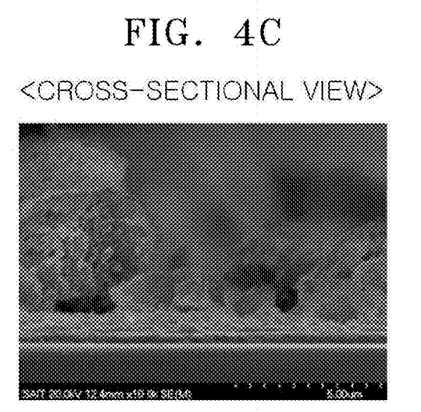

An SEM image of each of the electrodes prepared in Example 1 and Comparative Example 1 were captured and are respectively shown in FIGS. 3A to 3B (Example 1) and FIGS. 4A to 4C (Comparative Example 1).

Referring to FIGS. 3A to 3C and 4A to 4C, the electrode prepared in Example 1 included a metal oxide ($Co_3O_4$) having a flake shape (i.e., a metal oxide having an aspect ratio of about 100 and in the form of a uniform film which was uniformly coated on a surface of the FTO). However, the electrode prepared in Comparative Example 1 included a metal oxide ($Co_3O_4$) had a non-uniform shape (i.e. a metal oxide composed of nanoparticles having an aspect ratio of about 2 which may not completely cover the surface of FTO, or including large aggregated particles).

Evaluation Example 2

Analysis of ICP

Each of the electrodes prepared in Examples 1 through 3 were analyzed using an inductively coupled plasma ("ICP") device. The results are shown in Table 2

TABLE 2

| | Example 1 | Example 2 | Example 3 |
|---|---|---|---|
| Al Ratio [Al/(Co + Al)] | 0 | 0.38 | 0 |
| Si Ratio [Si/(Co + Si)] | 0 | 0 | 0.30 |

Evaluation Example 3

Analysis of XRD

Each of the electrodes prepared in Examples 1 through 3 and Comparative Example 1 was analyzed using a X-ray diffractometer ("XRD"). The results of the XRD analysis are shown in FIG. 5.

Figure 5:
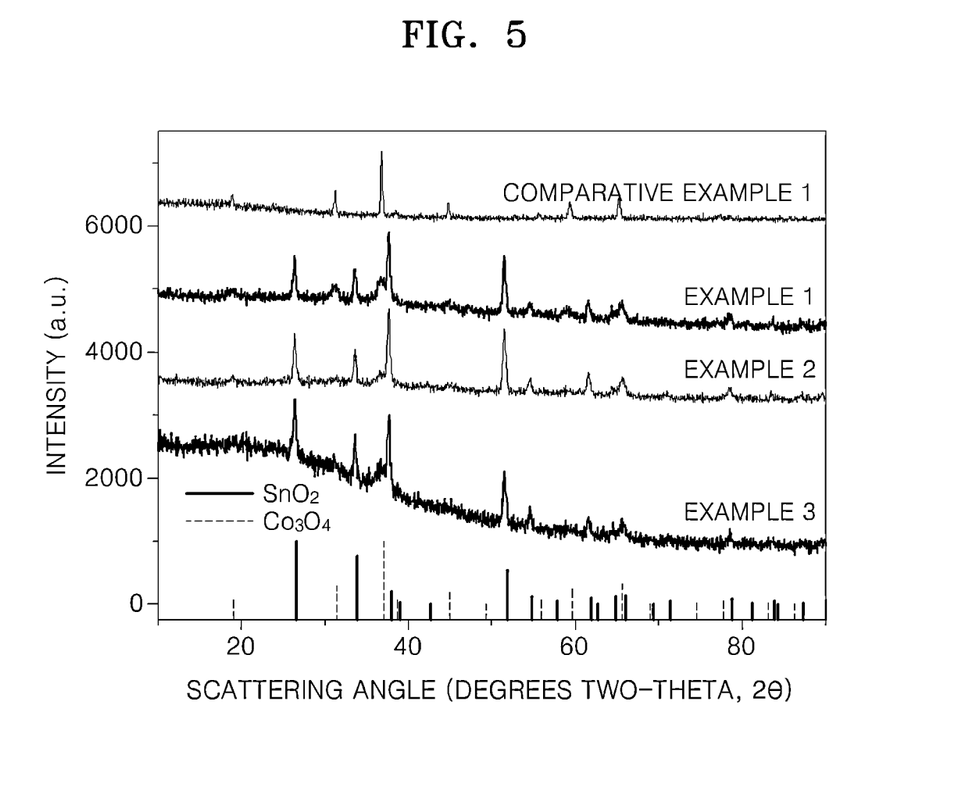
FIG. 5 is a graph of intensity (arbitrary units, a.u.) versus scattering angle (degrees two-theta, 2θ) and is an X-ray diffraction ("XRD") pattern of each of the electrodes prepared in Examples 1 through 3 and Comparative Example 1, and an idealized calculated pattern for SnO$_2$ and Co$_3$O$_4$.

Referring to FIG. 5, all of the electrodes prepared Examples 1 through 3 and Comparative Example 1 have a $Co_3O_4$-based structure.

Evaluation Example 4

Evaluation of Specific Surface Area

A specific surface area of each of the electrodes prepared Examples 1 through 3 and Comparative Example 1 were measured by using an electrochemical method. Specifically, a potential range (i.e., 0.2 V to 0.4 V vs. Ag/AgCl (3 M NaCl)), wherein an electrochemical reaction of a working electrode does not occur, in 0.1 M of KPi solution (the same solution used in Comparative Example 2) was selected, and cyclic voltammetry was performed while changing the scan rate. A double layer capacitance ($C_{dl}$) was obtained from a slope of a linear range of a plot of the charging current density (i.e., a current density of a cathode (working electrode) at 0.3 V) versus the scan rate. A roughness factor of each of the electrodes was obtained by dividing $C_{dl}$ of each electrode obtained as described above by $C_{dlo}$ of the FTO substrate of 1 cm², wherein $C_{dlo}$ was measured for a pristine FTO substrate onto which a tape was attached except for 1 cm² of the surface area. The roughness factor (i.e., 150) of the electrode obtained in this regard was converted to a specific surface area using an amount of $Co_3O_4$ coated on 1 cm² obtained by the ICP. The result is shown in Table 3 below.

TABLE 3

| | Example 1 | Comparative Example 1 |
|---|---|---|
| Specific Surface Area [m²/g] | 100 | 3 |

Referring to Table 3, the metal oxide prepared in Example 1 has a specific surface area 30 times or more than the metal oxide prepared in Comparative Example 1.

Evaluation Example 5

Analysis of Electrochemical Oxygen Evolving Characteristics

Figure 6:
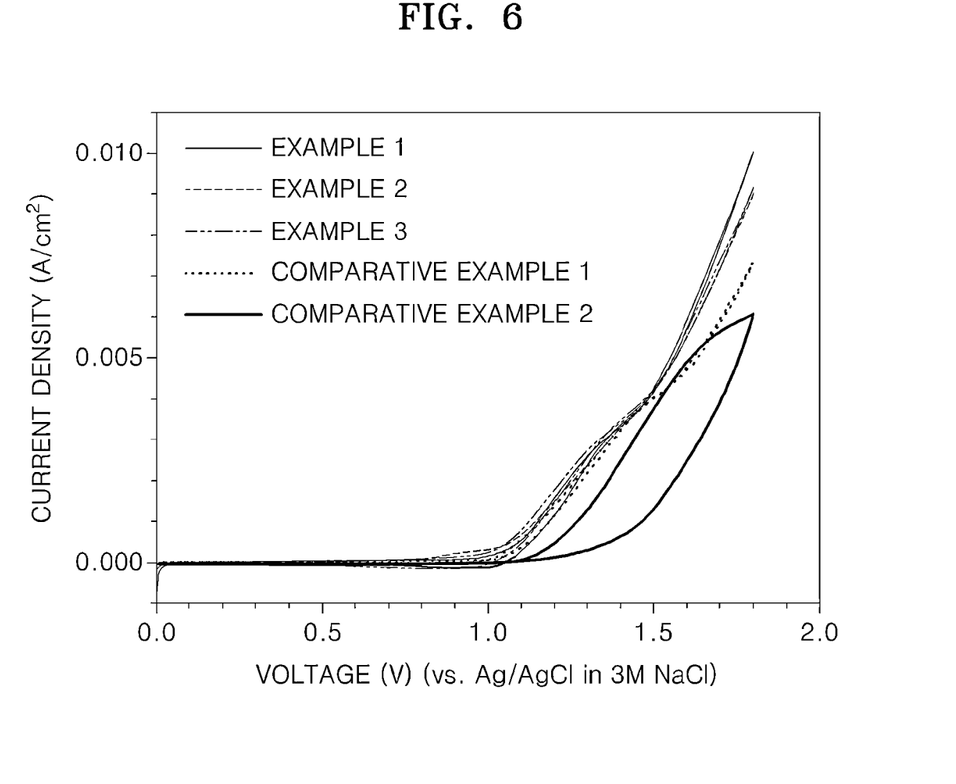
FIG. 6 is a graph of current density (amperes per square centimeter, A/cm$^2$) versus voltage (volts versus Ag/AgCl in 3 molar NaCl) and is a linear scan voltammogram of each of the electrodes prepared in Examples 1 through 3 and Comparative Examples 1 and 2.

Electrochemical oxygen evolving characteristics of each electrode prepared in Examples 1 through 3 and Comparative Examples 1 and 2 were analyzed. The results are shown in FIG. 6. A 3-electrode cell filled with a buffered aqueous electrolyte solution was used as a testing device. The electrode prepared in each of Examples 1 through 3 and Comparative Examples 1 and 2 were used as a working electrode of the 3-electrode cell, Ag/AgCl (3 M NaCl) was used as a reference electrode, platinum gauze was used as a counter electrode, and a 0.1 M KPi solution having a pH of 7, the same as the solution used in Comparative Example 2, was used as the buffered aqueous electrolyte solution. Specifically, the electrochemical oxygen evolving characteristics of each of the electrodes were analyzed by linear scan voltammetry at a scan rate of 1 mV/sec.

Referring to FIG. 6, each of the electrodes prepared in Examples 1 through 3 has better electrochemical oxygen evolving characteristics than each of the electrodes prepared in Comparative Examples 1 and 2. According to FIG. 6, since the current density is high, a very large of amount of electrons (e⁻) are produced by the water splitting oxygen evolving reaction ($2H_2O \rightarrow O_2 + 4H^+ 4e^-$), which indicates that the oxygen evolving characteristics are excellent.

Evaluation Example 6

Evaluation of Operational Stability of Electrode

Figure 7:
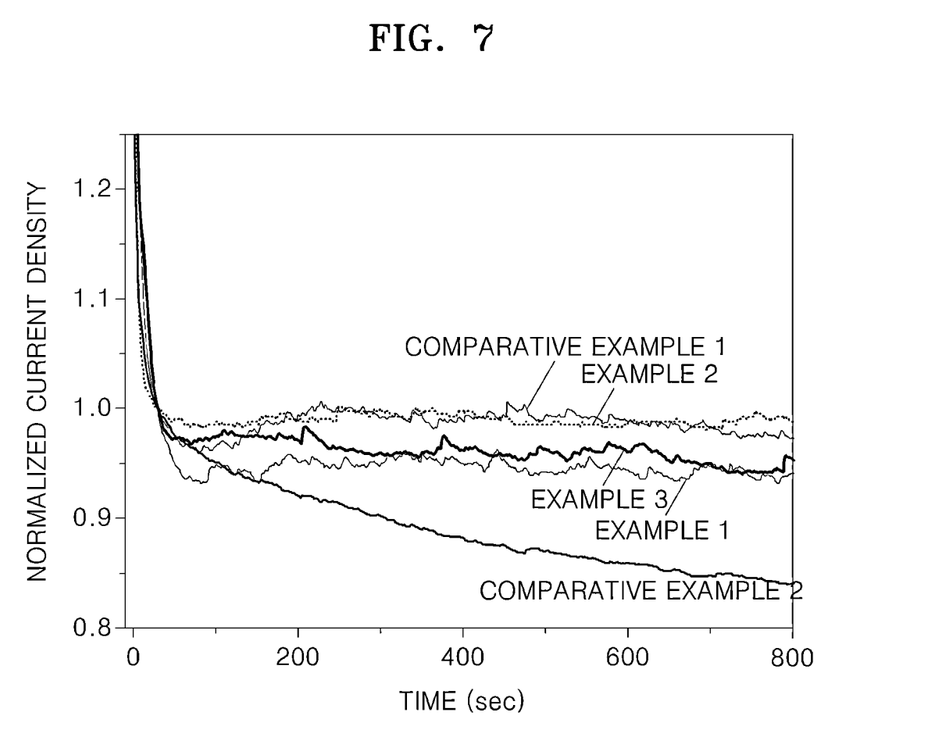
FIG. 7 is a graph of normalized current density versus time (seconds, sec) showing the operational stability of each of the electrodes prepared in Examples 1 through 3 and Comparative Examples 1 and 2, the operational stability being evaluated using a buffered aqueous electrolyte solution having a pH of 7.
Figure 8:
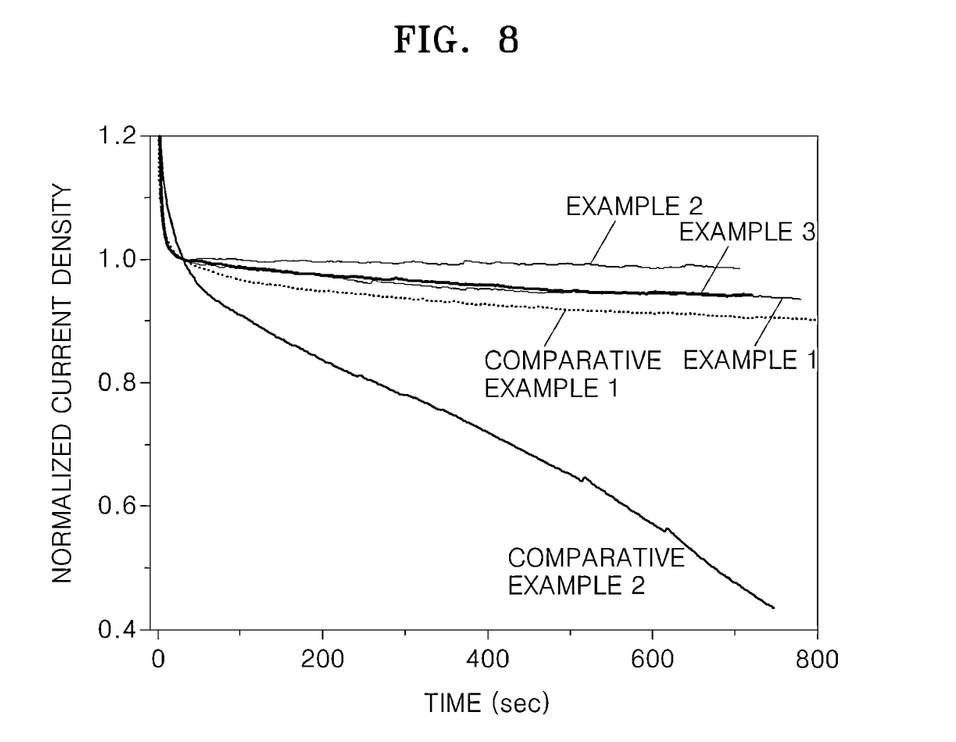
FIG. 8 is a graph of normalized current density versus time (seconds, sec) showing the operational stability of each of the electrodes prepared in Examples 1 through 3 and Comparative Examples 1 and 2, the operational stability being evaluated using a buffered aqueous electrolyte solution having a pH of 5.
Figure 9:
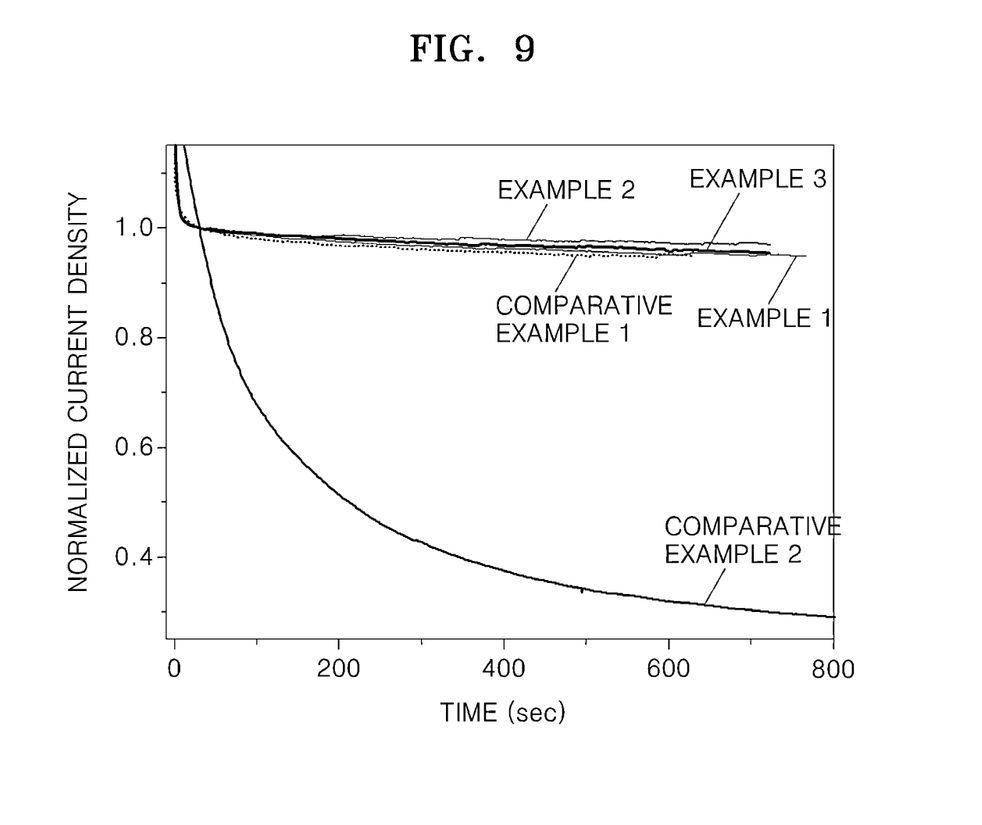
FIG. 9 is a graph of normalized current density versus time (seconds, sec) showing the operational stability of each of the electrodes prepared in Examples 1 through 3 and Comparative Examples 1 and 2, the operational stability being evaluated using a buffered aqueous electrolyte solution having a pH of 2.

An operational stability of each of the electrodes prepared in Examples 1 through 3 and Comparative Examples 1 and 2 was evaluated. The results are shown in FIGS. 7 through 9. In FIGS. 7 through 9, normalized current density refers to current density divided by a current density at 30 seconds after applying a voltage. A 3-electrode cell filled with a buffered aqueous electrolyte solution was used as a testing device. The electrode prepared in each of Examples 1 through 3 and Comparative Examples 1 and 2 were used as a working electrode of the 3-electrode cell, Ag/AgCl (3 M NaCl) was used as a reference electrode, platinum gauze was used as a counter electrode, and 0.1 M KPi solution (equivalent to that used in Comparative Example 2) was used as the buffered aqueous electrolyte solution. Specifically, the operational stability of each of the electrodes was evaluated by changing a voltage applied between the working electrode and the counter electrode and the pH of the buffered aqueous electrolyte solution. Details are shown in Table 4 below.

TABLE 4

| | Case 1 | Case 2 | Case 3 |
|---|---|---|---|
| Applied Voltage (V) | 1.5 | 1.62 | 1.80 |
| pH of the Buffered Aqueous Electrolyte Solution | 7 | 5 | 2 |
| Related FIG. | FIG. 7 | FIG. 8 | FIG. 9 |

Referring to FIGS. 7 through 9, the electrodes prepared in Examples 1 through 3 have better operational stabilities and better oxygen evolving characteristics regardless of the applied voltage and the pH of the buffered aqueous electrolyte solution compared to the electrodes prepared in Comparative Example 2. For reference, since the electrode prepared in Comparative Example 1 includes highly crystalline $Co_3O_4$, the operational stability is better than or similar to that of the electrodes prepared in Examples 1 through 3 (FIGS. 7 through 9). However, the electrochemical oxygen evolving characteristics of the electrode prepared in Comparative Example 1 is worse than that of the electrodes prepared in Examples 1 through 3.

As described above, a water splitting oxygen evolving catalyst according to the above embodiment has improved activity, reduced manufacturing cost, and improved operational stability.

It should be understood that the exemplary embodiments described herein should be considered in a descriptive sense only and not for purposes of limitation. Descriptions of features, advantages, or aspects within each embodiment should be considered as available for other similar features, advantages or aspects in other embodiments.

What is claimed is:

1. A water splitting oxygen evolving device comprising:
   a working electrode;
   a counter electrode; and
   a buffered aqueous electrolyte solution comprising a proton-accepting anion,
   wherein the working electrode comprises a water splitting oxygen evolving catalyst, the water splitting oxygen evolving catalyst comprising a metal oxide represented by Formula 1:

$$Co_{(1-x)}M_xO_y$$    Formula 1 wherein M is at least one selected from Al, In, Ga, Si, and Sn,
   wherein x and y respectively satisfy the inequalities 0<x<0.50 and 1<y<2 and the metal oxide particle is in the form of a flake.

2. The water splitting oxygen evolving device of claim 1, wherein the metal oxide particle has an aspect ratio of about 50 to about 500.

3. The water splitting oxygen evolving device of claim 1, wherein a specific surface area of the metal oxide particle, when measured by an electrochemical method, is about 50 m2/g to about 1000 m2/g.

4. The water splitting oxygen evolving device of claim 1, wherein the proton-accepting anion comprises at least one type of ion selected from a phosphate ion, an acetate ion, a borate ion, and a fluoride ion.

5. The water splitting oxygen evolving device of claim 1, wherein a pH of the buffered aqueous electrolyte solution is about 2 to about 14.

6. A method for making a water splitting oxygen evolving device, the method comprising:

preparing a water splitting oxygen evolving catalyst comprising a metal oxide particle comprises a metal oxide represented by Formula 1, $$Co_{(1-x)}M_xO_y$$ Formula 1 wherein M is at least one selected from Al, In, Ga, Si, and Sn, wherein x and y respectively satisfy the inequalities $0<x<0.50$ and $1<y<2$, preparing a working electrode comprising the water splitting oxygen evolving catalyst; and assembling the working electrode, a counter electrode, and a buffered aqueous electrolyte solution comprising a proton-accepting anion to provide the water splitting oxygen evolving device;

wherein preparing the water splitting oxygen evolving catalyst comprises:

providing a metal nitrate aqueous solution;

adding the metal nitrate aqueous solution to an electrochemical cell comprising a working electrode and a counter electrode;

applying a voltage between the working electrode and the counter electrode so that the working electrode has a negative potential and a metal hydroxide is formed from the metal nitrate on the working electrode; and heat treating the metal hydroxide on the working electrode to convert the metal hydroxide to a metal oxide to prepare the water splitting oxygen evolving catalyst.

7. The method of claim 6, wherein the metal nitrate aqueous solution comprises Co.

8. The method of claim 7, wherein the metal nitrate aqueous solution further comprises at least one metal selected from Al, In, Ga, Si, and Sn.

9. The method of claim 6, wherein the negative potential of the working electrode is about −0.5 V to about −1.5 V versus Ag/AgCl, and the applying of the voltage is for about 1 minute to about 5 minutes.

10. The method of claim 6, wherein the working electrode comprises at least one selected from a fluorinated tin oxide, an indium tin oxide, a metal, and carbon.

11. The method of claim 6, further comprising a reference electrode, wherein the reference electrode comprises at least one selected from Ag/AgCl, a saturated calomel electrode, Hg/HgO, and Hg/Hg$_2$SO$_4$.

12. The method of claim 6, wherein the counter electrode comprises at least one selected from platinum, nickel, carbon, and iron.

13. The method of claim 6, wherein the heat treatment is performed at a temperature of about 300° C. to about 450° C.

14. A water splitting oxygen evolving device comprising:

a working electrode;

a counter electrode; and a buffered aqueous electrolyte solution comprising a proton-accepting anion, wherein the working electrode comprises a water splitting oxygen evolving catalyst effective to split water at a potential of −0.5 V to −1.5 V versus Ag/AgCl, the catalyst comprising:

a metal oxide represented by Formula 1:

$$Co_{(1-x)}M_xO_y$$ Formula 1 wherein M is at least one selected from Al, In, Ga, Si, and Sn, wherein x and y respectively satisfy the inequalities $0<x<0.50$ and $1<y<2$ and the metal oxide particle is in the form of a flake.

15. The device of claim 14, wherein the metal oxide particle has an aspect ratio of about 50 to about 500.

16. The device of claim 14, wherein the catalyst has a solubility in an aqueous acid which is less than a solubility of C0304 in the aqueous acid.

\* \* \* \* \*